3,074,795
PRODUCTION OF BACITRACIN ADSORBATE AND PROCESS OF ADMINISTRATION TO ANIMALS FOR PROMOTING GROWTH
Ira J. Friedman, Hicksville, and Edward G. Martin, East Northport, N.Y., assignors to Chas. Pfizer & Co., Inc., New York, N.Y., a corporation of Delaware
No Drawing. Filed Nov. 12, 1959, Ser. No. 852,173
4 Claims. (Cl. 99—2)

This application is concerned with a new and unusually efficient process for the isolation and purification of bacitracin, and with a novel and valuable bacitracin resin adsorbate produced thereby.

As is well known, the useful antibiotic bacitracin is produced by certain strains of B. subtilis grown on nutrient media in the presence of air, as described in U.S. Patent 2,498,165 and in numerous other publications. In the past, a variety of recovery procedures have been employed, with varying degrees of success, to isolate and purify the active principal from the fermentation broths and other solutions. Extraction with water-immiscible solvents, precipitation with various agents, and adsorption on alumina, activated carbon and zeolitic materials have, for example, been described. These procedures have been characterized by relatively low efficiency with respect to yield and degree of purification. A substantial advance was achieved when, as described in U.S. Patent 2,776,240, tests with innumerable resins led to the discovery that bacitracin can be sorbed by certain ion-exchange resins containing carboxyl groups. Further experimentation with ion-exchange resins seemed inadvisable in view of the very great number of unsuccessful resin experiments reported therein.

In spite of this unpromising prospect, the wholly unexpected discovery has now been made that adsorption of bacitracin on certain other resins is not only possible, but that substantial advantages can be achieved thereby. According to this novel process, bacitracin is isolated from its solutions, including fermentation broths, by contact with certain sulfonated copolymers of styrene and divinylbenzene. The resins employed in this invention are remarkably selective for bacitracin and exhibit unprecedented capacity for the antibiotic.

The new adsorbates have a number of other important advantages. For example, bacitracin in this new form is extremely stable; in accelerated tests the adsorbates retain 80–90% of original potency under conditions which cause loss of half of the potency of bacitracin itself. The new adsorbates are eminently suitable for use in feed supplements for such animals as swine and poultry, to control infections due to sensitive organisms and to promote growth. Supplements and mixed feeds containing these products can be stored for long periods of time without fear of appreciable change in bacitracin potency.

Furthermore, bacitracin is readily eluted from these adsorbates under relatively mild conditions and in substantially quantitative yield, making them an excellent route for the preparation of pure bacitracin from crude sources such as fermentation broths. Overall yields of 95–97% or even higher from fermentation broth to highly purified, concentrated resin eluate are readily achieved. Processing cost is exceedingly low, since evaporation is eliminated, and it is not even necessary to prefilter the broth. Resin costs are also low, since very little resin is required, capacities of up to 3600 units of bacitracin per ml. of resin or even higher (up to 24,000 units per gram of dry adsorbate or more) being achieved. After adsorption and elution of the antibiotic the resin is ready for reuse. In addition, eluates of such excellent quality are obtained that further processing to highly pure, white bacitracin, if desired, is appreciably simplified.

The resins which provide these important advantages are the synthetic cross-linked cation-exchange resins made by sulfonating copolymers of styrene and divinyl benzene. Those resins prepared from polymerization mixtures containing from about 1 to about 3% of divinyl benzene are preferred. While higher or lower levels may be successfully employed, from as low as about 0.5% to as high as about 6% divinyl benzene, it has been found that resins prepared from polymerization mixtures containing substantially less than 1% divinyl benzene are deficient in strength and difficult to handle, while resins prepared from mixtures containing 4% or more divinyl benzene have appreciably reduced capacity for the antibiotic.

These resins are commercially available, but may be readily prepared, if desired, by well known methods, such as those described in U.S. Patent 2,366,007 and in Journal of the Chemical Society, 1951, page 494. They may represent mixtures polymerized in bulk and later ground to convenient particle size, or they may be suspension polymers prepared in fine beadlet form. A wide range of particle sizes may be employed, with the preference dictated by the intended use. Thus, for example, relatively coarse particles of, say, 20–50 mesh size will usually be more convenient for bacitracin purification procedures, but where the adsorbate is to be included in a feed supplement fine powders ranging from 100 to 200 mesh or finer may be preferred for more uniform distribution of the activity in the ration.

The resins may be employed in their free sulfonic acid form, but it is ordinarily more convenient to employ them in the form of a salt, preferably a salt with a monovalent cation. For use in treatment of animals, a feed-acceptable resin salt will of course be selected, that is, one which is free from adverse effect on the animal at the level of ordinary use. The sodium, potassium and ammonium salts of these resins are eminently suitable.

The present invention is perhaps best illustrated by describing its application to the recovery of bacitracin from an aqueous fermentation broth. Such broths, which typically contain about 30–70 bacitracin units per ml., may be prefiltered if desired but this is by no means necessary. For optimum adsorption results the broth pH should be adjusted to a value from about 3 to about 7, and preferably from about 4 to about 6. At pH values materially below 3 the bacitracin tends to be unstable, while values substantially above 7 usually lead to reduced adsorption yields. For the pH adjustment a mineral acid, such as sulfuric acid, is suitable. The adsorption may be conducted batchwise in a vessel equipped with an agitator, or it may be accomplished by passing the broth over the resin contained in a column. For batch operation with an efficient agitator an adsorption time of about 30 minutes to about 4 hours at room temperature is ordinarily adequate; in columns, space velocities which do not exceed 0.2 ml. of broth per minute per ml. of resin bed volume are desirable, and a space velocity of about 0.1 is found to be convenient.

To insure optimum recovery of bacitracin from solution, the proportion of a particular resin to be employed will first be determined by experiment. Studies have shown that with resins having a total capacity of about 5 milliequivalents per gram (dry basis) it is practical to adsorb up to a gram or more of bacitracin activity from fermentation broths per gram of dry resin weight. For column operation, it is most accurate to assay successive portions of effluent and continue the adsorption until break-through is evidenced by the appearance of appreciable concentrations of bacitracin in the waste liquor. In this step, most of the impurities are separated and better than 95% of the bacitracin is readily recovered on the resin. For feed purposes the adsorbate may now be dried and blended with feed-acceptable diluents for storage or blending with the ration.

On the other hand, if the isolation of pure bacitracin is the object, the antibiotic activity can readily be eluted from the resin by batchwise or column treatment with a suitable eluant. Many eluting agents, including aqueous salt solutions, may be employed, but for most efficient elution an aqueous base is preferred. The best yields are obtained if the pH of the eluting agent is about 7.5–8.5. pH's materially below 7.5 do not effect efficient desorption, while pH's substantially above 8.5 may cause decomposition of the bacitracin. A particularly convenient eluting agent is aqueous sodium bicarbonate, for example, about a 2% solution, having a pH of about 8–8.2. The quantity of eluant required will naturally vary with the other conditions employed, but for substantially complete elution sodium bicarbonate equivalent to at least about 4 or 5 times the total resin capacity is preferred. Elution in an agitated vessel is often substantially complete in about 1–4 hours, while for column operation a space velocity of about 0.05–0.1 per minute is usually effective. If a sodium bicarbonate solution has been employed as the eluting agent, the resin is now in its sodium form and ready for reuse.

The bacitracin in the resin eluate, typically at a concentration of about 200 units per ml., often represents up to 95–97% or more of the original broth activity and is free from most of the original impurities. It can be easily converted to pure bacitracin by a variety of methods. For example, it can be extracted into a suitable solvent such as butanol at about pH 7–8.5; usually no pH adjustment of the resin eluate is required. Inorganic salts may then be eliminated by washing the butanol solution with water and the bacitracin re-extracted into water adjusted to about pH 2.5 with sulfuric acid. Neutralization with barium hydroxide, filtration, and drying the filtrate complete the process. The product, white bacitracin sulfate at a potency of about 65 units per mg., can be obtained in an overall yield from broth of about 80–85%.

Alternatively, the resin eluate may be freed of sodium ions by treatment with a highly cross-linked sulfonic acid resin, such as one containing about 8–16% divinyl benzene. As a further variation, relatively pure bacitracin sulfate may be prepared by eluting the adsorbate with sufficient aqueous ammonia to furnish an equilibrium pH of about 7.5–8.5, concentrating in vacuum to eliminate ammonia, and neutralizing with sulfuric acid. Many alternative processes for the final purification of the resin eluates will occur to those skilled in the art. Those described here are cited merely to illustrate the ease with which the high quality eluates obtained from the new adsorbates can be converetd to substantially pure bacitracin if desired.

The resin adsorbates of the present invention are useful, without further purification, in animal feed supplements. They have important advantages for these applications in that the antibiotic adsorbed on the resin is appreciably protected from the acid gastric juices and passes practically unchanged into the intestinal tract, which, having a higher pH, is effective in freeing the antibiotic from the resin, facilitating absorption into the system. These absorbates are especially valuable in animal feeds in view of the surprising and unexpected stability which they possess. They are particularly useful in the case of nonruminant animals, such as chickens, turkeys, hogs and the like. Employed in concentrations equivalent to about 1–10 grams bacitracin activity per ton of feed, they are valuable in enhancing and stimulating the animals' growth rate and improving feed efficiency. While some effect may be obtained at concentrations materially below 1 gram per ton, it may be variable, and it is advisable not to use appreciably lesser amounts. The new adsorbates may also be employed in the treatment of infections due to sensitive organisms, as, for example, in the treatment of fowl respiratory diseases or bacterial enteritis of swine. Desirable levels per ton of feed will vary with the nature and severity of the infection, but levels above 10 grams and up to as high as 200 grams bacitracin equivalent, or even higher, may sometimes be desirable. These new adsorbates may be used in animal feeds in conjunction with other antibiotic or therapeutic agents such as penicillin, oxytetracycline, chlortetracycline, tetracycline, phenylarsonic acid, sulfaquinoxaline, or the like. The adsorbates are conveniently blended with feed-acceptable inert or nutritional diluents to form a premix or feed supplement containing, for example, about 5–50 grams of bacitracin activity per pound, which is suitable for mixing with a nutritionally balanced ration. They may be blended with grains, fish meal, bone meal, soybean meal, limestone and with vitamin-containing and amino-acid-containing ingredients, or the like. Finally, the mixture may be pelleted if desired. The bacitracin activity remains stable in the adsorbate, premix and feed during long periods of storage even at relatively high temperatures.

The following examples are provided by way of illustration and should not be interpreted as limiting the invention, the scope of which is defined by the appended claims.

*Example I*

A cation exchange resin is prepared in the following manner:

A mixture of inhibitor-free styrene together with 2% divinylbenzene and 1% benzoyl peroxide is added to three times its volume of water in a reaction vessel equipped with agitator and reflux condenser. A trace of magnesium carbonate is added to facilitate suspension and the mixture is vigorously agitated and heated at about 90° C. until polymerization is complete. The resulting bead polymer is separated, washed and sulfonated by heating at 100° C. with an equal volume of concentrated sulfuric acid in the presence of 1% silver sulfate for 10 hours. The sulfonated copolymer is washed, dried, and screened to a particle size of 20–50 mesh. The resin, having a total exchange capacity of about 5 meq. per g. (dry basis), is then converted to the sodium form by treatment with aqueous sodium hydroxide followed by a water wash. The product has a moisture content of about 90%. A portion is dried to a moisture content of about 5%.

*Example II*

A series of additional cation exchange resins is prepared by the procedure of Example I, substituting 1, 4, 5.5, 8 and 9 percentages respectively of divinylbenzene for the 2% concentration employed earlier, and drying to a moisture content of about 5%.

*Example III*

30 gms. of bacitracin sulfate having a potency of 50 units per mg. is dissolved in 1200 ml. of water and the solution is divided into six equal portions. To each portion is added 5 gms. of one of the dried cation exchange resins of Examples I and II, and each slurry is agitated for an hour at room temperature. At the conclusion of this period the portions are filtered, the filtrates assayed for residual bacitracin sulfate content, and the adsorption yields calculated. Results are as follows:

| Percent Divinylbenzene | Percent Adsorption |
|---|---|
| 1 | 99 |
| 2 | 96 |
| 4 | 63 |
| 5.5 | 59 |
| 8 | 7 |
| 9 | 2 |

Example IV 12 grams of bacitracin sulfate having a potency of 50 units per mg. is dissolved in 600 ml. of water and the solution is divided into six equal portions. The solutions, having an initial pH of about 5.9, are adjusted to a variety of pH values, from 3 to 8, with 6 N sulfuric acid and dilute sodium hydroxide, as required. To each is added 2 grams of the dried cation exchange resin of Example I. The mixtures are stirred for one hour and each adsorbate is then separated and eluted with 100 ml. of 2% aqueous sodium bicarbonate solution. The filtrates and eluates are assayed for bacitracin, with the following results:

| Adsorption pH | | Percent Adsorbed |
|---|---|---|
| Start | After 1 hour | |
| 3.0 | 3.5 | 98+ |
| 4.0 | 5.4 | 98+ |
| 5.0 | 6.3 | 95+ |
| 6.0 | 6.9 | 90 |
| 6.9 | 7.2 | 65 |
| 8.0 | 8.6 | 42 |

Example V 10 gallons of unfiltered plant fermentation broth containing 50 units per ml. of bacitracin is adjusted to pH 4 with dilute sulfuric acid and 400 grams of the undried resin (moisture content about 90%) of Example I is added. After an hour's vigorous stirring at room temperature the slurry is filtered and the filtrate, which contains considerable color, is assayed and discarded. Adsorption yield is about 97% and the adsorbate has a potency of about 24,000 units per g. (dry basis), equivalent to about 3600 units per ml. of the wet resin.

The wet resin is charged to a small adsorption column containing an 80 mesh screen as a resin support, and the antibiotic activity is eluted with 9 liters of a 2% aqueous sodium bicarbonate solution having a pH of about 8.1. The eluant is passed over the column once at a constant rate in six hours.

The column effluent, having a potency of about 200 bacitracin u./ml. and a pH of about 7.5, is extracted batchwise with 3 one-third volumes of butanol. The butanol extracts are combined, washed with a half volume of distilled water to remove inorganic impurities, and extracted with 2 equal volumes of water adjusted to an equilibrium pH of about 2.5 with sulfuric acid. The water wash and the spent butanol are discarded. 2 gms. of activated decolorizing carbon are added to the two combined aqueous extracts and the pH is adjusted to about 5.1 with barium hydroxide. The resulting slurry is filtered, concentrated and freeze-dried to yield about 24 gms. of white bacitracin sulfate having a potency of 65 units per mg. and a moisture content of about 4%. Overall yield from broth to pure product is about 83%. A 500 u./ml. water solution of the product exhibits a 98.5% light transmission at 440 mμ.

Example VI

Two grams quantities of the resin adsorbate of Example V are stored at 104° C. for 24 hours. Duplicate initial and 24-hour samples are assayed and bacitracin activity retention under the test conditions is found to be 85%.

Example VII

A growth-stimulating feed for chicks is prepared by including the resin adsorbate of Example V at a level of 3 grams bacitracin activity per ton in the following basal ration.

| Ingredients: | Diet (lbs.) |
|---|---|
| Ground yellow corn | 56.44 |
| 44% solvated soybean meal | 26.94 |
| Corn gluten meal | 2.50 |
| Alfalfa meal | 2.00 |
| Stabilized animal fat | 1.50 |
| Fish meal | 4.00 |
| Dried corn distillers solubles | 1.00 |
| Dried whey (50% delactosed) | 1.00 |
| Dried brewers' yeast | 1.50 |
| Iodized salt | 0.40 |
| Calcium carbonate | 1.30 |
| Calcium phosphate, dibasic | 1.00 |
| Delamix | 0.10 |
| DL-methionine | 0.01 |
| Vitamin A (10,000 I.U./g.) | 0.05 |
| Vitamin $B_{12}$ | 0.020 |
| Vitamin $D_3$ (1,500 I.C.U./g.) | 0.05 |
| Riboflavin | 0.05 |
| DL-calcium pantothenate | 0.001 |
| Niacin | 0.001 |
| Choline chloride, 25% | 0.125 |
| N,N'-diphenyl-phenylenediamine | 0.0125 |

Example VIII

A growth-stimulating feed for baby pigs is prepared by including the resin adsorbate of Example V at a level of 3 grams bacitracin activity per ton in the following basal ration.

| Ingredients: | Lbs. |
|---|---|
| Finely ground yellow corn | 51.5 |
| Soybean oil meal (about 50%) | 15.0 |
| Dried skim milk | 20.0 |
| Strained bone meal | 1.0 |
| Limestone | 0.5 |
| Salt (iodized) | 0.5 |
| Stabilized animal fat | 4.0 |
| Sucrose | 6.0 |
| Vitamin mix F | 1.0 |
| Mineral mix F | 0.5 |
| Saccharin, 22.7 gms. | |

What is claimed is:

1. An antibiotic feed supplement comprising a feed-acceptable diluent together with an adsorbate of bacitracin on a feed-acceptable salt of a sulfonated copolymer of styrene and from about 0.5 to about 6% by weight of divinyl benzene, said adsorbate being present in a concentration equivalent to from about 5 to about 50 grams of bacitracin activity per pound of said supplement.

2. A feed composition comprising a nutritionally balanced animal feed together with a small proportion of an adsorbate of bacitracin on a feed-acceptable salt of a sulfonated copolymer of styrene and from about 0.5 to about 6% by weight of divinyl benzene.

3. A composition as claimed in claim 2 wherein said adsorbate is present in a concentration equivalent to from about 1 to about 200 grams of bacitracin activity per ton of said composition.

4. The process for promoting growth in animals which comprises administering thereto an adsorbate of bacitracin on a feed-acceptable salt of a sulfonated copolymer of styrene and from about 0.5 to about 6% by weight of divinyl benzene.

References Cited in the file of this patent

UNITED STATES PATENTS

| 2,366,007 | D'Alelio | Dec. 26, 1944 |
| 2,459,139 | Dimick et al. | Jan. 18, 1949 |
| 2,582,921 | Charney | Jan. 15, 1952 |
| 2,776,240 | Shortridge | Jan. 1, 1957 |
| 2,834,711 | Zinn et al. | May 13, 1958 |
| 2,827,417 | Friedman et al. | Mar. 18, 1958 |
| 2,960,437 | Friedman et al. | Nov. 15, 1960 |

FOREIGN PATENTS

| 533,410 | Canada | Nov. 20, 1956 |
| 507,162 | Canada | Nov. 9, 1954 |